United States Patent
Genda

(10) Patent No.: US 10,721,364 B2
(45) Date of Patent: Jul. 21, 2020

(54) COMPRESSING AN IMAGE BASED ON AN ABNORMALITY IN THE IMAGE

(71) Applicant: Konica Minolta, Inc., Tokyo (JP)

(72) Inventor: Daisuke Genda, Kawasaki (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/908,154

(22) Filed: Feb. 28, 2018

(65) Prior Publication Data
US 2018/0262626 A1    Sep. 13, 2018

(30) Foreign Application Priority Data
Mar. 13, 2017    (JP) .................................. 2017-046910

(51) Int. Cl.
| | |
|---|---|
| *H04N 1/00* | (2006.01) |
| *H04N 1/32* | (2006.01) |
| *H04N 19/48* | (2014.01) |
| *G01N 21/892* | (2006.01) |
| *B41F 33/00* | (2006.01) |

(52) U.S. Cl.
CPC ..... *H04N 1/00005* (2013.01); *B41F 33/0045* (2013.01); *G01N 21/892* (2013.01); *H04N 1/00037* (2013.01); *H04N 19/48* (2014.11)

(58) Field of Classification Search
CPC .......... H04N 1/00005; H04N 1/00037; H04N 19/48; H04N 1/32277; G01N 21/892
See application file for complete search history.

(56) References Cited

U.S. PATENT DOCUMENTS

2018/0096232 A1*  4/2018  Danielsson .......... G06K 9/6202

FOREIGN PATENT DOCUMENTS

| JP | H9-5032 A | 1/1997 |
|---|---|---|
| JP | 2015141093 A | 8/2015 |
| JP | 2017-50743 | 3/2017 |
| WO | 02/23480 A1 | 3/2002 |

OTHER PUBLICATIONS

Methods and Limits of Digital Image Compression of Retinal Images for Telemedicine, Eikelboom et al., Jun. 2000, retrieved from https://iovs.arvojournals.org/article.aspx?articleid=2123131 (Year: 2000).*
English language machine translation of JP 2017-050743 to Kiminori (Year: 2017).*
English language machine translation of JP 09005032 A to Kogure et al. (Year: 1997).*
Japanese Office Action dated Apr. 2, 2019 for counterpart Japanese Patent Application No. 2017-046910 and English translation.

* cited by examiner

*Primary Examiner* — Eric A. Rust
(74) *Attorney, Agent, or Firm* — Lucas & Mercanti, LLP

(57) ABSTRACT

An image inspection apparatus includes a tester and an image storage processor. The tester inspects image data for an abnormality and, in a case where the tester detected an abnormality, further detects a kind of the abnormality. The image data is generated by reading a surface of a sheet on which an image is formed by an image forming apparatus. The image storage processor determines a compression condition depending on whether or not the tester detected an abnormality and depending on the kind of the abnormality, performs compression processing of the image data under the compression condition, and generates data to be stored.

14 Claims, 6 Drawing Sheets

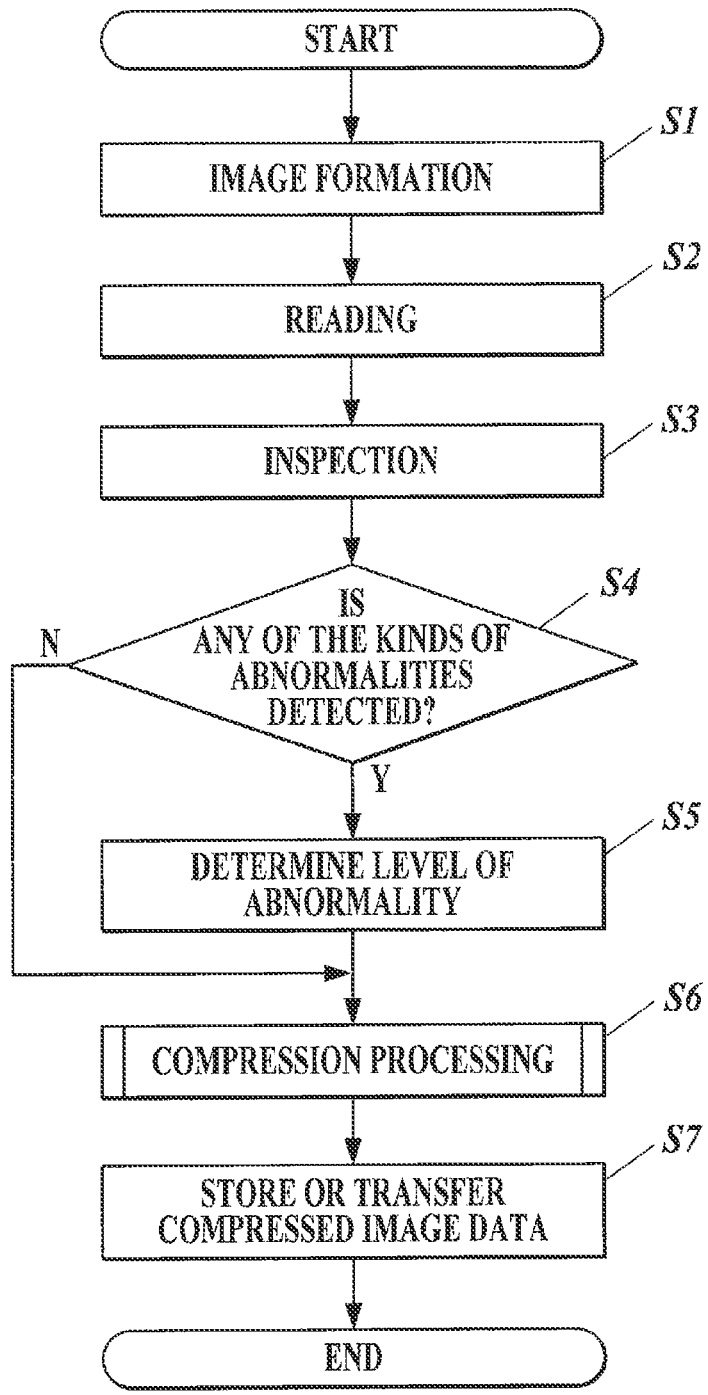

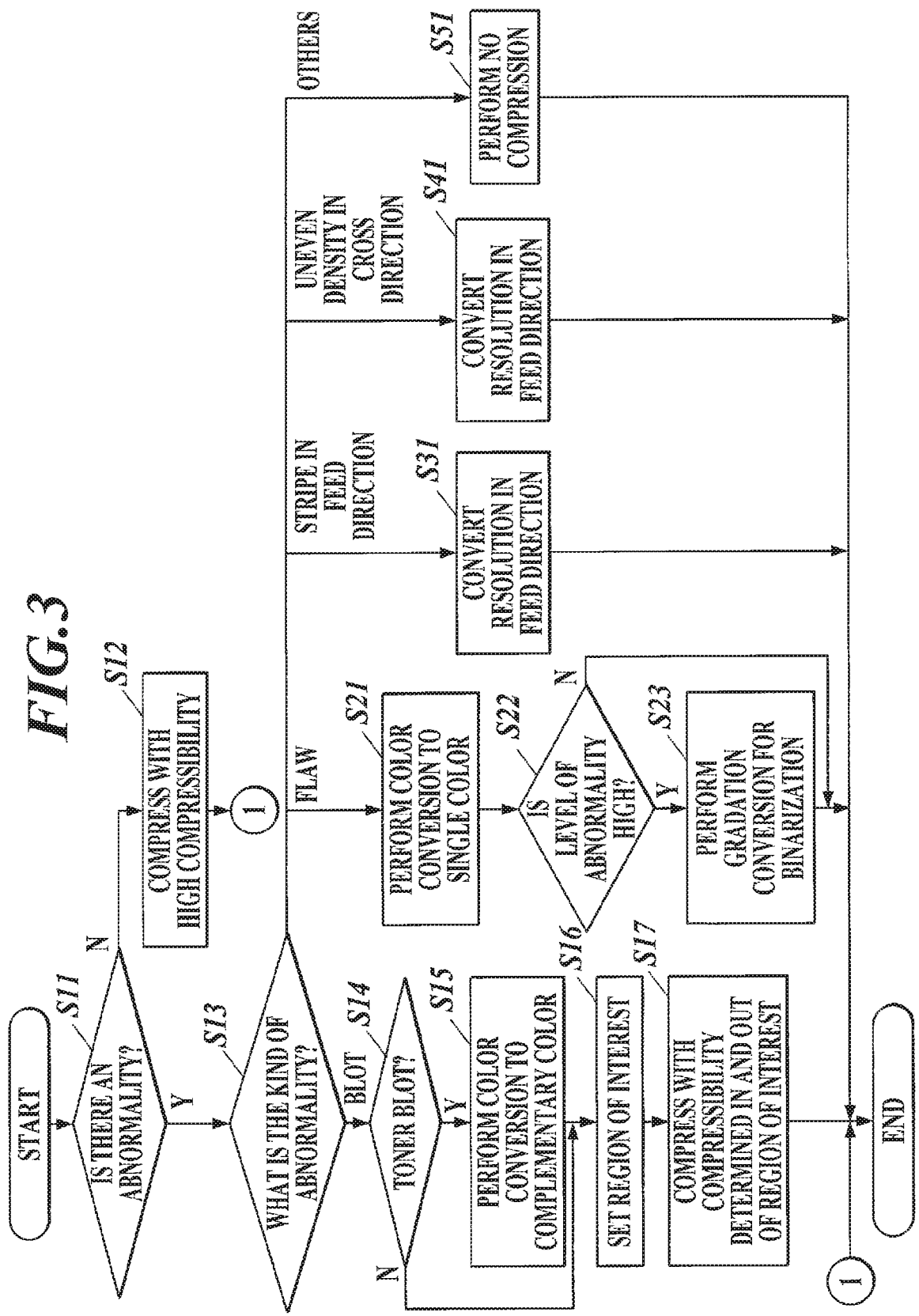

FD
CD

COMPRESSING AN IMAGE BASED ON AN ABNORMALITY IN THE IMAGE

BACKGROUND

1. Technological Field

The present invention relates to an image inspection apparatus, an image forming system, and an image compression method.

2. Description of the Related Art

An image forming apparatus such as a printer and a copying machine analyzes image data generated by reading a sheet surface on which an image is formed and thereby inspects the image data for an abnormality such as toner scattering, blots, stripes, uneven density. The image data used for the inspection is usually stored so that a user can confirm the inspection results later.

Since the image data is generated for each sheet, and an enormous amount of data is stored. Therefore, the image data to be stored is conventionally subjected to compression processing. For further reduction of data amount, there is suggested a method where image data is reversibly compressed when an abnormality exists and image data is compressed irreversibly with high compressibility when there is no abnormality (for example, see Japanese Patent Application Laid Open Publication No. hei9-5032 and International Patent Application Publication No. 2002/023480). There is also suggested a method where an evaluation value of the stored image data is calculated and the image data is removed when the evaluation value is low (for example, see Japanese Patent Application Laid Open Publication No. 2015-141093).

However, there are many kinds of abnormalities and images have different features from each other. There is still room for further reduction of the data amount because, depending on the feature of an image, high resolution or color information may not necessary.

SUMMARY

An object of the present invention is to reduce the data amount of data to be stored depending on the kind of abnormalities.

To achieve at least one of the abovementioned objects, according to an aspect of the present invention, an image inspection apparatus includes a tester which inspects image data for an abnormality and, in a case where the tester detected an abnormality, further detects a kind of the abnormality, wherein the image data is generated by reading a surface of a sheet on which an image is formed by an image forming apparatus; and an image storage processor which determines a compression condition depending on whether or not the tester detected an abnormality and depending on the kind of the abnormality, performs compression processing of the image data under the compression condition, and generates data to be stored.

According to another aspect of the present invention, an image forming system includes an image former which forms an image on a sheet; an image reader which generates image data by reading a surface of the sheet on which an image is formed by the image former; a tester which inspects the image data generated by the image reader for an abnormality and, in a case where the tester detected an abnormality, further detects a kind of the abnormality; and an image storage processor which determines a compression condition depending on whether or not the tester detected an abnormality and depending on the kind of the abnormality, performs compression processing of the image data under the compression condition, and generates data to be stored.

According to another aspect of the present invention, an image compression method includes: inspecting image data for an abnormality and, in a case where the tester detected an abnormality, further detecting a kind of the abnormality, wherein the image data is generated by reading a surface of a sheet on which an image is formed by an image forming apparatus; determining a compression condition depending on whether or not an abnormality is detected and depending on the kind of the abnormality, and generating data to be stored by compressing the image data under the compression condition.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 2 is a flowchart showing a procedure for forming an image and performing an inspection in an image forming system;

FIG. 3 is a flowchart showing a procedure for performing compression processing at an image storage processor;

DETAILED DESCRIPTION OF EMBODIMENTS

Hereinafter, one or more embodiments of the image inspection apparatus, the image forming system, and the image compression method according to the present invention will be described with reference to the drawings. However, the scope of the invention is not limited to the disclosed embodiments.

[Image Forming System]

Figure 1:
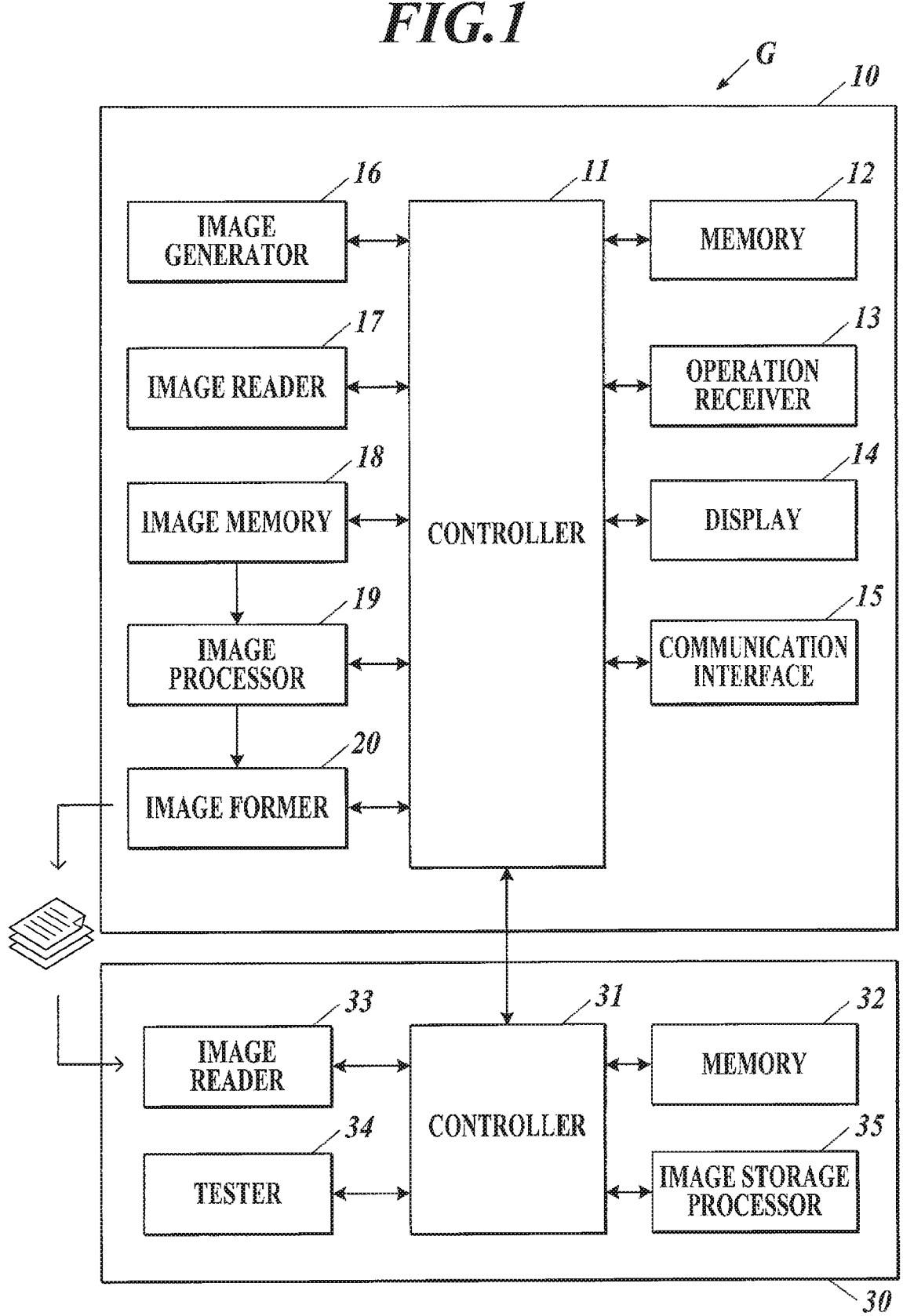
FIG. 1 is a block diagram showing a functional configuration of an embodiment of an image forming system of the present invention.

FIG. 1 shows a main configuration of the image forming system G according to an embodiment of the present invention.

As shown in FIG. 1, the image forming system G includes an image forming apparatus 10 and an image inspection apparatus 30.

In the image forming apparatus G, the sheet surface on which an image is formed by the image forming apparatus 10 is read by the image inspection apparatus 30 so that inspection for an abnormality is performed.

[Image Forming Apparatus]

The image forming apparatus 10 includes, as shown in FIG. 1, a controller 11, a memory 12, an operation receiver 13, a display 14, a communication interface 15, an image generator 16, an image reader 17, an image memory 18, an image processor 19, and an image former 20.

The controller 11 includes a CPU (Central Processing Unit), a RAM (Random Access Memory), and the like. The controller 11 controls each unit in the image forming apparatus 10 by reading out and executing various programs from the memory 12.

For example, the controller 11 makes the image processor 19 perform an image processing of original image data which is generated by the image generator 16 or the image reader 17 and stored in the image memory 18, and makes the image forming unit 20 form an image on a sheet on the basis of the processed original image data.

In the memory 12, programs which can be read by the controller 11, files which are used for executing the programs, and the like are stored. A large capacity memory such as a hard disk can be used as the memory 12.

The operation receiver 13 generates operation signals depending on operations by a user and outputs the operation signals to the controller 11. As the operation receiver 13, a key pad, a touch panel which is formed integrally with the display 14 or the like can be used.

The display 14 displays an operation screen and the like in accordance with the instruction by the controller 11. As the display 14, an LCD (Liquid Crystal Display), an OELD (Organic Electro Luminescence Display), and the like can be used.

The communication interface 15 communicates with an external device on a network such as a user terminal, a server, other image forming systems, and the like.

The communication interface 15 receives data in which an instruction content for forming an image is written in a page description language (PDL) (hereinafter, may be referred to as PDL data) from a user terminal via the network.

The image generator 16 carries out rasterizing processing on the PDL data which is received by the communication interface 15 and generates original image data in bitmap format. With respect to the original image data, each pixel has gradation values of four colors which are C (cyan), M (magenta), Y (yellow), and K (black). The gradation value is a data value which represents the contrasting density of an image. For example, a data value of 8 bits represents a density level based on 0 to 255 gradation.

The image reader 17 includes an automatic sheet feeder, a scanner, and the like. The image reader 17 reads the surface of a document which is set on a document platform and generates original image data in bitmap format. With respect to the original image data generated by the image reader 17, each pixel has gradation values of three colors which are R (red), G (green), and B (blue). Such original image data is subjected to color conversion by a color converter (not shown in the drawing) or the controller 11, so that original image data having gradation values of four colors which are C, M, Y, and K is generated.

The image memory 18 is a buffer memory in which the original image data generated by the image generator 16 or the image reader 17 is temporarily stored. As the image memory 18, a DRAM (Dynamic RAM) and the like can be used.

The image processor 19 reads out the original image data from the image memory 18 and carries out various image processing on the original image data, such as layout processing including image rotation, image expansion, image reduction, addition of page numbers, and condensation of pages; line thinning; density correction; halftone processing to express a pseudo halftone.

The image former 20 forms an image of four colors on a sheet depending on the gradation values of four colors which are C, M, Y and K of each pixel in the original image data processed by the image processor 19.

Specifically, the image former 20 includes exposers, photoreceptors, developers and the like for the respective colors of C, M, Y and K. The image former 20 emits laser beams by means of the exposers, which are modulated depending on the gradation values of each pixel in the image data. The image former 20 scans the electrically charged photoreceptors and supplies toners by means of the developers. Electrostatic latent images formed on the photoreceptors by the laser beams are thereby developed. The image former 20 thus sequentially forms respective color images of C, M, Y and K on the respective photoreceptors, and then transfers the images from the photoreceptors onto a transfer body such as an intermediate transfer belt, where the images are superposed with each other (primary transfer). The image former 20 further transfers the obtained color images from the transfer body to a sheet (secondary transfer). A fixation device heats and presses the sheet for fixation processing.

[Image Inspection Apparatus]

The image inspection apparatus 30 includes, as shown in FIG. 1, a controller 31, a memory 32, an image reader 33, a tester 34, and an image storage processor 35.

The controller 31 includes a CPU, RAM, and the like and controls each units in the image inspection apparatus 30 by reading out and executing various programs from the memory 32.

For example, the controller 31 makes the image reader 33 read the sheet surface to generate image data and makes the tester 34 inspect the image data. The controller 31 further makes the image storage processor 35 compress the image data to generate the data to be stored.

In the memory 32, programs which can be read by the controller 31, files which are used when executing the programs, the data to be stored generated by the image storage processor 35, and the like are stored. A large capacity memory such as a hard disk can be used as the memory 32.

The image reader 33 reads the sheet surface on which an image is formed at the image former 20 and generates image data in bitmap format. With respect to the image data, there are gradation values of three colors which are R, G, and B.

As the image reader 33, a line sensor, an area sensor, a digital camera, scanner, and the like, which include imaging devices such as charge coupled devices (CCDs) can be used. The image reader 33 may be provided with an automatic sheet feeder, if necessary.

The image reader 33 may be disposed on the sheet conveyance path at downstream side from the fixation device of the image forming apparatus 10. Otherwise, the image reader 33 may be separately constituted so that a surface of a sheet manually set by a user can be read.

The tester 34 inspects the image data generated by the image reader 33 for one or more kinds of abnormalities. The tester 34 may detect not only an abnormality due to the image forming apparatus 10 for maintenance but also an abnormality such as a missing character and a mistaken character. Examples of the kinds of abnormalities due to the image forming apparatus 10 include a toner blot due to leakage from a toner cartridge or charging abnormality of the photoreceptor, a blot due to adhesion of paper powder or dust, a wrinkle due to an eccentric feeding roller, a flaw due to contact with the feeding roller or the like, a stripe due to deteriorated developing reagent or contact with a roller having foreign substances, uneven density due to distortion of an optical system in the exposer, varying distance between the developer and the photoreceptor, or the like.

For example, the tester 34 compares the image data to be inspected with the original image data or checked normal image data and calculates their difference. When the difference exceeds an allowable value, an image region corresponding to the inspected image data is detected as a region having an abnormality. Otherwise, the tester 34 may determine one or more feature points and feature amounts thereof respectively in the original image data and the image data to be inspected. The feature amounts are analyzed using a discriminant analysis method. An image region including a feature point which is determined not to be similar to feature points in the original image is detected as a region having an abnormality. The method to determine the feature amounts is not especially limited and may use histograms of oriented gradients, Speeded Up Robust Features (SURF), Local Binary Pattern (LBP), Haar wavelet, color histograms, and the like. The discriminant analysis method is not especially limited and may use a neural network, a support vector machine, and the like.

If an abnormality is detected, the tester 34 determines kind and level of the abnormality.

For example, feature amounts of images having the same kind of abnormality are similar to each other, thus the tester 34 determines the kind of the detected abnormality on the basis of a similarity between the feature amount of the feature point determined have an abnormality and predetermined feature amounts corresponding to each kinds of abnormalities, such as toner blots, stripes, and the like.

The tester 34 may determine that the level of the abnormality is higher when the abnormality is visualized more easily. For example, as the difference in gradation values from of the normal image data is larger or as the size of the region detected have an abnormality is larger, the abnormality can be visualized more easily. As a result, the level of the abnormality can be determined depending on the difference or the size.

The tester 34 can inspect the detected abnormality for each kind of abnormality by sequentially using detection algorithmic programs respectively specialized for detecting each kind of abnormalities. Thus, the tester 34 can inspect the image data for one or more kinds of abnormalities and can determine the one or more kinds of the detected abnormalities.

Depending on whether or not the tester 34 detected an abnormality and depending on the kinds of the detected abnormality, the image storage processor 35 determines a compression condition of the image data subjected to abnormality detection. The image storage processor 35 compresses the image data subjected to abnormality detection under the determined compression condition to generate the data to be stored. The data to be stored may be stored in the memory 32 or may be transferred to an external device such as the image forming apparatus or a server and stored in a memory of the external device.

The tester 34 and the image storage processor 35 perform the above processing using a software processing by a processor such as CPU or GPU (Graphics Processing Unit) which reads and executes programs for inspection and image storage processor respectively.

FIG. 2 shows a procedure to form and inspect an image taken in the above image forming system G.

As shown in FIG. 2, in the image forming system G, an image is formed on a sheet in the image forming apparatus 10 (step S1). In the image inspection apparatus 30, the image reader 33 generates image data by reading the surface of the sheet on which the image is formed (step S2). The image reader 17 of the image forming apparatus 10 may read the surface of the sheet and generate image data, so that the image inspection apparatus 30 acquire the generated image data.

The tester 34 inspects the generated image data for one or more abnormalities (step S3). If any kind of abnormalities is detected in the inspection (step S4: Y), the tester 34 determines the level of the detected abnormality (step S5). Subsequently, the image storage processor 35 determines a compression condition depending on whether or not the tester 34 detected an abnormality and depending on the kinds of the abnormality detected by the tester 34. The image storage processor 35 compresses the image data subjected to abnormality detection under the determined compression condition and generates the data to be stored (step S6). Meanwhile, if no abnormality is detected (step S4: N), the processing to determine the level of abnormality in step S5 is omitted and the image storage processor 35 generates the data to be stored (step S6).

FIG. 3 shows a procedure of a compression processing taken by the image storage processor 35.

As shown in FIG. 3, if the tester 34 detects no abnormality (step S11: N), the image storage processor 35 determines the compression condition so that the image data subjected to abnormality detection is compressed with high compressibility and performs compression under the determined compression condition (step S12). If no abnormality is detected, there is no target to be particularly inspected. This allows compressing processing with high compressibility so that the amount of the data to be stored is largely reduced.

Examples of the compression processing by the image storage processor 35 include encoding processing, resolution conversion processing, thinning processing, trimming processing, color conversion processing, and gradation conversion processing. The exemplified processing may be performed alone or in combination.

The compression condition for compression processing relates to, for example, selection of reversible or irreversible encoding in encoding processing, resolution after resolution conversion processing, number of pixels removed in the thinning processing, size of image region cut out by the trimming processing, number of colors of the image data after color conversion processing, number of gradations after gradation conversion processing, and the like.

In the encoding processing, compared to a reversible compression such as PING and GIF compression, an irreversible compression such as JPEG compression realizes higher compressibility and more reduction of the data amount.

In the resolution conversion processing, the lower the resolution after conversion is, the higher compressibility and the more reduction of the data amount are realized. In the thinning processing, the more the number of removed pixels is, the higher compressibility and the more reduction of the data amount are realized. In the trimming processing, the smaller the size of the image region to be cut out is, the higher compressibility and the more reduction of the data amount are realized.

In the color conversion processing, the data amount can be reduced by color conversion to reduce the color number of the image data. The more the color number of the image data after color conversion is reduced, the higher the compressibility can be.

Examples of gradation conversion processing include abnormality diffusion processing, screen processing using dither matrix, and the like. The data amount can be reduced by reducing the color number of image data, for example, by converting image data having 256 gradations (8 bits) to image data having 2 gradations (1 bit). The more the number of gradations after gradation conversion is reduced, the higher the compressibility can be.

As a compression condition with high compressibility when there is no abnormality, the image storage processor 35 can determine to perform encoding processing by an irreversible compression method, for example. Otherwise, the image storage processor 35 can determine to perform multiple processes in combination. For example, resolution conversion processing to convert resolution of image from 200 dpi to 20 dpi and color conversion processing to convert the image data with three colors (R, G, and B) to image data with only one color (G) can be performed in combination.

Meanwhile, if the tester 34 detects an abnormality (step S11: Y), the image storage processor 35 determines the kind of the abnormality detected by the tester 34 (step S13). Examples of the kinds of abnormalities include, as mentioned above, a blot due to toner, paper powder, dust, and the like; flaws due to contact with the feeding roller, edge, and the like; stripes in the feed direction (FD) of a sheet due to deteriorated developing reagent or foreign substances adhered to the feeding roller; uneven density in the cross direction (CD) due to distortions of an optical system in the exposer, varying distance between the developer and the photoreceptor, and the like. The FD and the CD are orthogonal to each other.

If the kind of the abnormality is a blot (step S13: BLOT) which is a toner blot in particular (step S14: Y), the image storage processor 35 determines the compression condition so that color conversion processing is performed to convert image data of three colors (R, G, and B) to image data of a single color, which is a complementary color of the toner color adhering as the blot. The toner color adhering as the blot can be determined by analysis of the color at the blot. The image storage processor 35 performs color conversion processing depending on the determined compression condition and obtains image data of a single color, which is a complementary color, from the image data with multiple colors subjected to abnormality detection (step S15). For example, if the toner color adhering as the blot is Y (yellow), the image storage processor 35 performs color conversion from the image data with three colors which are R, G, and B generated by the image reader 33 to the image data with only B, which is the complementary color of Y. The amount of image data can be compressed to ⅓ thereby. Since the color of the image data after the color conversion corresponds to the complementary color of the color of adhering toner composing the toner blot, the part of the blot can be easily observed in the obtained image data to be stored.

After the color conversion, the image storage processor 35 sets a region of interest which includes the blot in the image data (step S16). When the blot is not a toner blot (step S14: N), the image storage processor 35 also sets a region of interest (step S16). The position of the blot can be specified depending on the position of the abnormality detected by the tester 34.

Figure 4A:
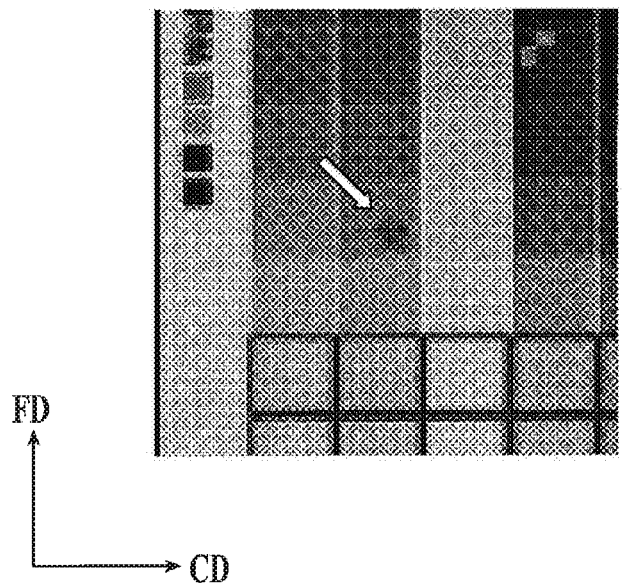
FIG. 4A is a diagram showing an example of a toner blot.

FIG. 4A shows an example of a toner blot. In FIG. 4A, the image part pointed by an arrow includes a toner blot.

Figure 4B:
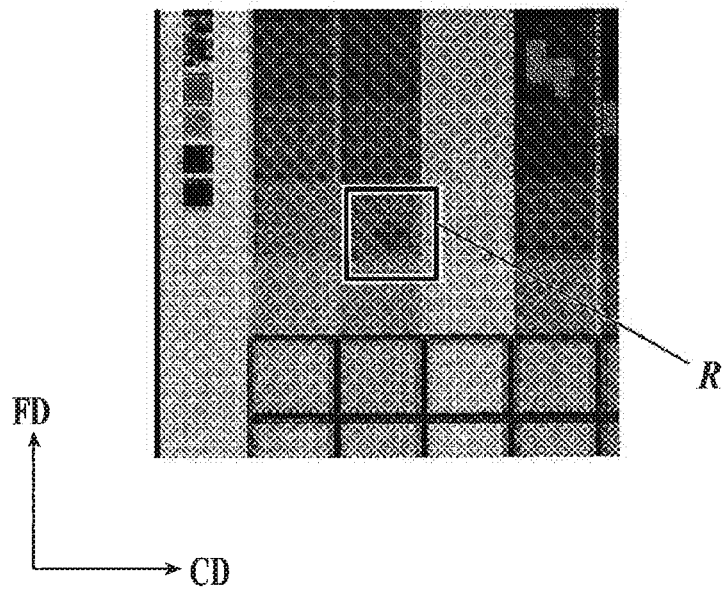
FIG. 4B is a diagram showing an example of region of interest including a toner blot.

FIG. 4B shows an example of a region of interest which is set on the basis of the toner blot in FIG. 4A.

As shown in FIG. 4B, the region of interest R is a rectangular region with the toner blot as a center.

The size of the region of interest can be determined depending on the size of the abnormality detected by the tester 34, however, since the size of a toner blot is constant in most cases, the size of the region of interest is preferably fixed by the image storage processor 35. The fixed size of the region of interest can be determined depending on the size experimentally calculated from toner blots. For example, if the blots due to adhered toner often have a diameter of 3 mm, the size of the region of interest can be fixed to 10 mm square.

The image storage processor 35 determines the compression condition in and out of the region of interest and performs compression of the image data under the determined compression condition (step S17). Specifically, as to the image in the region of interest and including a blot, it is determined that the image data is not compressed (compressibility: 0%) or compressed with low compressibility. As to the image out of the region of interest and including no blot, it is determined that the image data is compressed with high compressibility. Since concentration information is more important than resolution information for inspection of a blot, resolution conversion processing is suitable as the compression processing. Examples of the compression processing with low compressibility include encoding processing by a reversible compression method, resolution conversion processing from 200 dpi to 150 dpi, and the like. Examples of the compression processing with high compressibility include encoding processing by an irreversible compression method, conversion processing of resolution from 200 dpi to 50 dpi, and the like.

If the image storage processor 35 sets more than a predetermined number of the regions of interest, the image storage processor 35 can extract a fixed number of the regions of interest to determine the compressibility in and out of the region of interest. If the entire surface of the sheet is dirty or has a lot of blots, the data amount can be further reduced by limiting the number of the regions of interest subjected to compression processing with low compressibility. Since the cause of blots can be easily identified at a glance, a certain amount of regions of interest with high image quality are enough for inspection of a blot.

Meanwhile, if the kind of the abnormality is a flaw (step S13: FLAW), information of high resolution is useful for easy inspection, while information of concentration or color is not necessary. The image storage processor 35 determines the compression condition so that the image data is color-converted to image data of a single color. Depending on the determined compression condition, the image storage processor 35 performs color conversion processing which reduces the number of colors of the image data to a single color (step S21). In the color conversion processing of the image data with R, G, and B, image data of only G may be extracted and converted to a gray scale image. Otherwise, image data of a single color may be generated by weighted-averaging each gradation value of R, G, and B.

Figure 5:
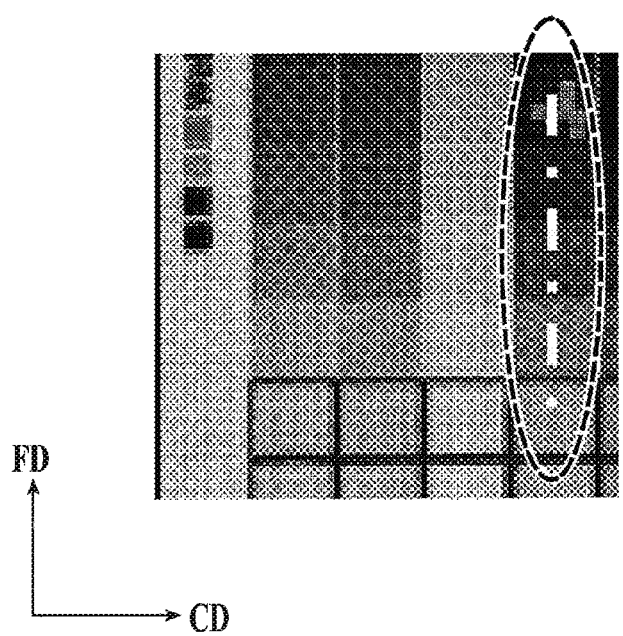
FIG. 5 is a diagram showing an example of flaws.

FIG. 5 shows an example of a flaw.

The white dashed-dotted line surrounded by a black dashed line in FIG. 5 illustrates flaws due to contact with a roller. Since the region where toner is peeled off due to the contact with the roller appears white, gray scaling can provide image data suitable for easy inspection of flaw.

If the tester 34 determines that the level of the abnormality (i.e. flaw) is equal to or higher than a threshold (step S22: Y), the image storage processor 35 determines to perform gradation conversion processing to obtain binary image data as a compression condition. If the level of the abnormality is high (for example, if the size of the flaw is large), the flaw can be sufficiently inspected by performing other compression processing in combination. As a result, the data amount can be further reduced. The image storage processor 35 performs gradation conversion processing depending on the determined compression condition (step S23) to compress the data amount by one eighth (⅛), for example, through reduction of the data amount per pixel from 8 bits to 1 bit. If it is determined that the level of the abnormality (i.e. flaw) is lower than the threshold (step S22: N), the gradation conversion processing is omitted.

If the kind of the abnormality is a stripe in the FD (step S13: STRIPE IN FEED DIRECTION), the image storage processor 35 determines the compression condition so that the data amount of the image data is reduced in the continuous FD, because stripes are continuously generated in the FD. In other words, stripes in the FD are similarly seen in the generated images. For example, the image storage processor 35 can determine to convert the resolution in the FD from 200 dpi to 100 dpi. The image storage processor 35 performs resolution conversion processing depending on the determined compression condition (step S31).

The image storage processor 35 can perform thinning processing with high compressibility to remove one pixel from every two pixels in the FD, trimming processing to cut out a part of the image in the FD, and the like, as the compression condition of the image data, instead of or in combination with the resolution conversion processing described above.

The image storage processor 35 can determine the compression condition depending on the level of the stripe in the FD as in the case of the flaw, for example, depending on the length of the stripe in the FD or the thickness of the stripe in the CD.

Because the position of a stripe in the CD is important for inspecting the stripe in the FD, the image storage processor 35 preferably maintains the original image data without compression processing in the CD or preferably performs compression processing under the compression condition suitable for maintaining the feature of the stripe. For example, the image storage processor 35 may perform thinning processing with low compressibility to remove one pixel from every five pixels in the CD or resolution conversion processing with low compressibility to convert the resolution in the CD from 200 dpi to 100 dpi.

As the data to be stored, the image storage processor 35 may prepare a histogram which represents integrated gradation values of pixels arranged in the FD. The position of the stripe is represented as a peak in such histogram and can be easily inspected. Furthermore, the amount of data such as histogram is far smaller than that of image data.

Figure 6:
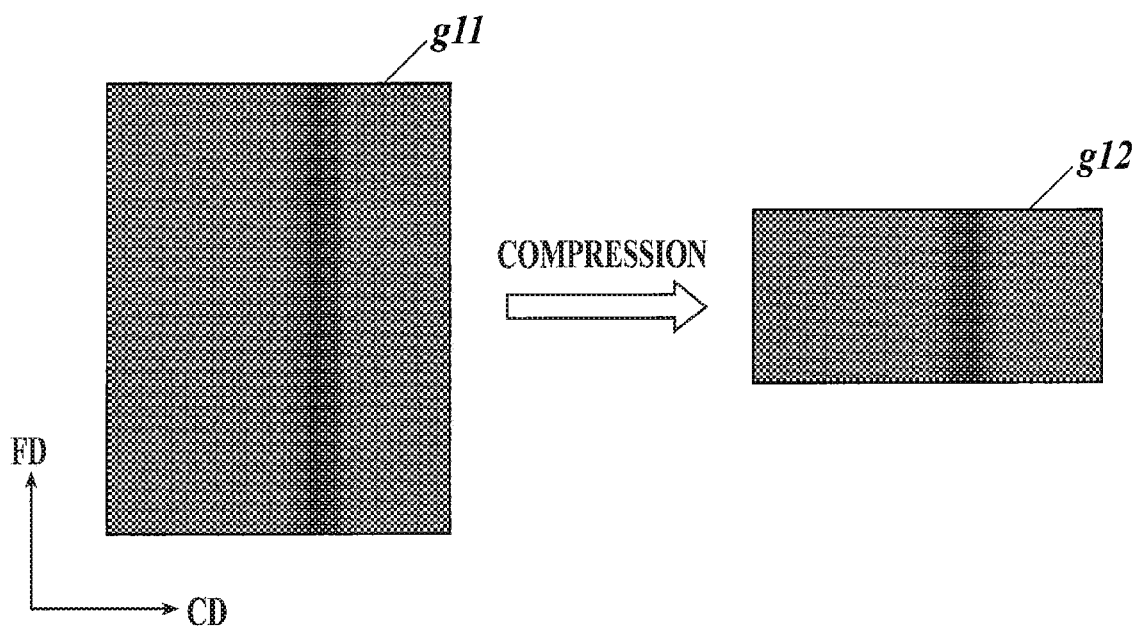
FIG. 6 is a diagram showing an example of compression processing of image data when a stripe in a feed direction of a sheet is detected.

FIG. 6 shows an example of compression processing of image data in which a stripe in the FD is detected.

As shown in FIG. 6, the image data g11 in which a stripe is detected is subjected to resolution conversion processing and thinning processing in the FD and the image data g12 is obtained. As a result of the resolution conversion processing and the thinning processing, the amount of the image data g12 is far smaller than that of the original image data g11.

If the kind of the abnormality is uneven density in the CD (step S13: UNEVEN DENSITY IN CROSS DIRECTION), the density changes in the CD, while the density continuously change in the FD. That is, uneven density in the FD is similarly represented in images. The image storage processor 35 determines the compression condition so that the data amount of the image data is reduced in the continuous FD. For example, the image storage processor 35 determines the compression condition of the image data so that the resolution in the FD is converted from 200 dpi to 20 dpi. The image storage processor 35 performs resolution conversion processing in the FD under the determined compression condition (step S41).

The image storage processor 35 may perform thinning processing with high compressibility to remove one pixel from every two pixels in the FD, trimming processing to cut out a part of the image data in a predetermined range of the FD, and the like, as the compression condition of the image data, instead of or in combination with the above resolution conversion processing.

As in the case of a flaw, the image storage processor 35 can determine the compression condition depending on the level of the abnormality regarding the uneven density in the CD, for example, depending on the difference in density, the range of the unevenness of density, and the like.

Because information of density in the CD is important for inspecting the uneven density in the CD, the image storage processor 35 preferably maintains the original data without compression processing in the CD or preferably performs compression processing under the compression condition suitable for maintaining the feature of the uneven density. For example, the image storage processor 35 may perform thinning processing with low compressibility to remove one pixel from every five pixels in the CD or resolution conversion processing with low compressibility to convert the resolution in the CD of 200 dpi to that of 50 dpi FIG. 7 shows an example of compression processing of image data in which uneven density in the CD is detected.

Figure 7:
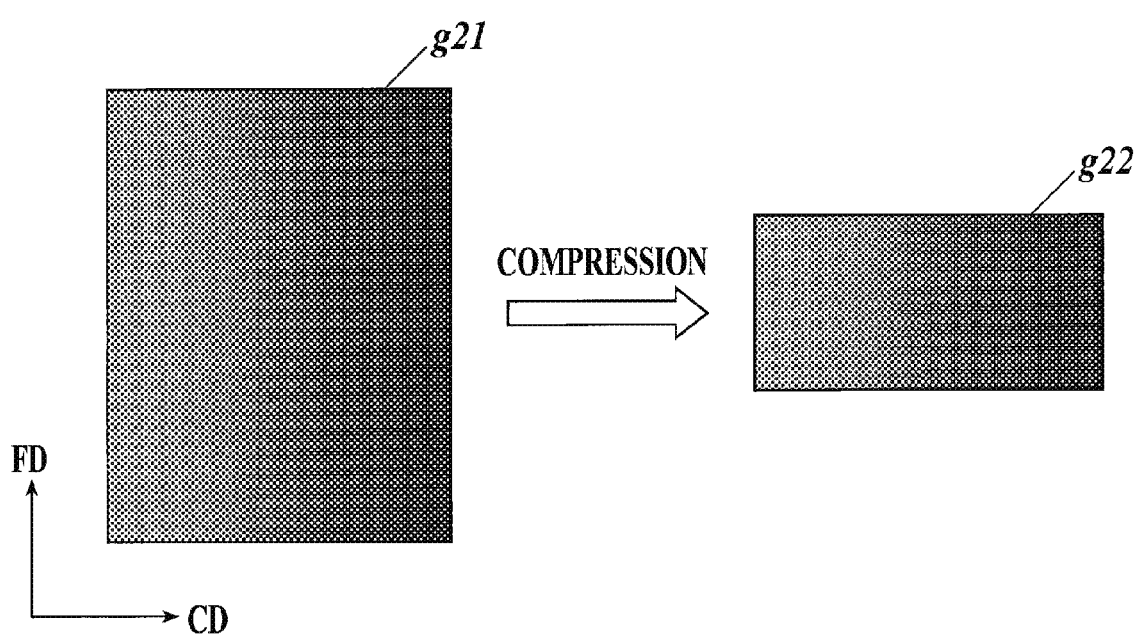
FIG. 7 is a diagram showing an example of compression of image data when uneven density in a direction perpendicular to the feed direction is detected.

As shown in FIG. 7, the image data g21 in which uneven density in the CD is detected is subjected to resolution conversion processing and trimming processing in the FD and the image data g22 is obtained. As a result of the resolution conversion processing and the trimming processing, the amount of the image data g22 is far smaller than that of the original image data g21.

If the detected abnormality is not any of the above-described kinds of abnormalities or cannot be classified into one of the above-described kinds of abnormalities (step S13: OTHERS), the image storage processor 35 determines the compression condition of the image data so that no compression is performed. The user can thereby detect and inspect the abnormality. Depending on the determined compression condition of no compression, the image storage processor 35 outputs the image data as it is, as the data to be stored (step S51). Instead of performing no compression, the image storage processor 35 may perform encoding processing by a reversible compression method to generate the data to be stored.

If multiple kinds of abnormalities are detected by the tester 34 from image data of one image, the image storage processor 35 may copy the image data to generate multiple sets of image data as many as the kinds of the detected abnormalities. Each of the sets of image data is subjected to compression processing under the compression condition determined for each abnormality. For example, if two kinds of abnormalities (a blot and a flaw) are detected, the image storage processor 35 copies the image data to generate two sets of image data. One of the two sets of image data is subjected to compression processing under the compression condition determined depending on the blot, and the other is subjected to compression processing under the compression condition determined depending on the flaw. Such multiple sets of data to be stored allow easy inspection of each kind of abnormalities (a blot and a flaw).

After generating the data to be stored by compression processing as mentioned above, the image storage processor 35 stores the data to be stored in the memory 32 or transfers the data to be stored to an external device specified as a storage destination, such as the image forming apparatus 10, a user terminal, and a server (step S7). The external device has a memory to store the transferred data to be stored.

If a part of the image data is cut out by trimming processing, the image data to be stored may be stored with the original image data, so that the image data which is partly cut out can be superposed on the original image data in displaying the image data to be stored.

As described above, the image forming system G according to the present embodiment includes the image former 20, the image reader 33, the tester 34, and the image storage processor 35. The image former 20 forms an image on a sheet. The image reader 33 reads the sheet surface on which the image is formed by the image former 20 and generates image data. The tester 34 inspects the image data generated by the image reader 33 for one or more kinds of abnormalities. The image storage processor 35 determines a compression condition depending on whether or not the tester 34 detected an abnormality and depending on the kinds of abnormalities detected by the tester 34, performs compression processing of the image data subjected to abnormality detection under the determined compression condition, and generates the data to be stored.

As a result, depending on the kind or detected abnormalities, compression processing can be performed so that unnecessary information for inspection is removed and necessary information for inspection is left. Accordingly, the amount of the data to be stored can be reduced depending on the kinds of abnormalities and the abnormalities can be easily inspected. A burden on the user can be thereby reduced.

The above-described embodiment is merely a suitable example of the present invention, and the present invention is not limited thereto. Suitable changes can be made without departing from the features of the present invention.

For example, the controller 11 may read a program and perform the processing which is performed by the tester 34 and image storage processor 35 in the above-described embodiment. Furthermore, instead of the image examination apparatus 30, a computer such as a universal PC may read the program and perform the above-described processing.

Non-volatile memories such as a ROM and a flash memory and portable recording media such as a CD-ROM are applicable as the computer-readable medium of the program. Carrier wave is also applicable as a medium for providing data of the program through a communication line.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese patent Application No. 2017-046910, filed on Mar. 13, 2017, is incorporated herein by reference in its entirety.

What is claimed is:

1. An image inspection apparatus comprising:
a tester which inspects image data for an abnormality and detects a kind of the abnormality, wherein the image data is generated by reading a surface of a sheet on which an image forming apparatus forms an image; and
an image storage processor which determines a compression condition, performs compression processing of the image data under the compression condition, and generates data to be stored,
wherein the compression condition determined by the image storage processor depends on whether or not the tester detected an abnormality and, when the tester detected an abnormality, the compression condition determined by the image storage processor also depends on the kind of abnormality detected by the tester, wherein a first compression condition is determined for a first type of abnormality and a second compression condition is determined for a second type of abnormality, the first type of abnormality being one of a toner blot, a flaw, and a continuous abnormality in the feed direction of the sheet or a direction perpendicular to the feed direction, the second type of abnormality being another one of a toner blot, a flaw, and a continuous abnormality in the feed direction of the sheet or a direction perpendicular to the feed direction, and the first compression condition being different than the second compression condition.

2. The image inspection apparatus according to claim 1, wherein, in a case where the tester detected no abnormality, the image storage processor determines the compression condition so that the compression processing is performed with a high compressibility.

3. The image inspection apparatus according to claim 2, wherein, in a case where the tester detected no abnormality, the image storage processor determines the compression condition so that the compression processing includes encoding processing by an irreversible compression method or includes resolution conversion processing and color conversion processing in combination.

4. The image inspection apparatus according to claim 1, wherein, in a case where the tester detected that the kind of the abnormality comprises a toner blot, the image storage processor determines the compression condition so that the compression processing includes color conversion processing by which the image data is converted to image data of a single color, wherein the single color is a complementary color of a color of adhering toner composing the toner blot.

5. The image inspection apparatus according to claim 1, wherein, in a case where the tester detected that the kind of the abnormality comprises a flaw, the image storage processor determines the compression condition so that the compression processing includes color conversion processing by which the image data is converted to image data of a single color.

6. The image inspection apparatus according to claim 1, wherein, in a case where the tester detected that the kind of the abnormality comprises a continuous abnormality in a continuous direction which is parallel to or perpendicular to a feed direction of a sheet, the image storage processor determines the compression condition so that amount of the image data is reduced in the continuous direction.

7. The image inspection apparatus according to claim 6, wherein, in a case where the tester detected that the kind of the abnormality comprises a stripe in the feed direction, the image storage processor determines the compression condition so that the compression processing includes at least one of resolution conversion processing, thinning processing to thin pixels in the feed direction, and trimming processing to cut out a part of the image data in a predetermined range of the feed direction.

8. The image inspection apparatus according to claim 6, wherein, in a case where the tester detected that the kind of the abnormality comprises uneven density in a direction perpendicular to the feed direction, the image storage processor determines the compression condition so that the compression processing includes resolution conversion processing, thinning processing to thin pixels in the feed direction, or trimming processing to cut out a part of the image data in a predetermined range of the feed direction.

9. The image inspection apparatus according to claim 1, wherein,
   the tester determines a level of the abnormality, and
   the image storage processor determines the compression condition depending on whether or not the tester detected an abnormality, the kind of the abnormality, and the level of the abnormality.

10. The image inspection apparatus according to claim 1, wherein, the tester inspects image data for an abnormality caused by the image forming apparatus.

11. The image inspection apparatus according to claim 1, wherein, the image storage processor determines the compression condition so that the compression processing includes at least one of encoding processing, resolution conversion processing, thinning processing, trimming processing, color conversion processing, and gradation processing.

12. The image inspection apparatus according to claim 1, wherein, in a case where the tester detected an abnormality, the image storage processor is configured to:
   determine the compression condition so that the compression processing includes color conversion processing by which the image data is converted to image data of a single color when the abnormality comprises a toner blot or a flaw;
   determines the compression condition so that amount of the image data is reduced in a continuous direction when the abnormality comprises a continuous abnormality in the continuous direction;
   determines the compression condition so that the compression processing includes at least one of resolution conversion processing, thinning processing to thin pixels in the feed direction, and trimming processing to cut out a part of the image data in a predetermined range of the feed direction when the abnormality comprises a stripe in the feed direction; and
   determines the compression condition so that the compression processing includes resolution conversion processing, thinning processing to thin pixels in the feed direction, or trimming processing to cut out a part of the image data in a predetermined range of the feed direction when the abnormality comprises uneven density in a direction perpendicular to the feed direction.

13. An image forming system comprising:
   an image former which forms an image on a sheet;
   an image reader which generates image data by reading a surface of the sheet on which the image former forms an image;
   a tester which inspects the image data generated by the image reader for an abnormality and further detects a kind of the abnormality; and
   an image storage processor which determines a compression condition, performs compression processing of the image data under the compression condition, and generates data to be stored,
   wherein the compression condition determined by the image storage processor depends on whether or not the tester detected an abnormality and, when the tester detected an abnormality, the compression condition determined by the image storage processor also depends on the kind of abnormality detected by the tester, wherein a first compression condition is determined for a first type of abnormality and a second compression condition is determined for a second type of abnormality, the first type of abnormality being one of a toner blot, a flaw, and a continuous abnormality in the feed direction of the sheet or a direction perpendicular to the feed direction, the second type of abnormality being another one of a toner blot, a flaw, and a continuous abnormality in the feed direction of the sheet or a direction perpendicular to the feed direction, and the first compression condition being different than the second compression condition.

14. An image compression method comprising:
   inspecting image data for an abnormality and further detecting a kind of the abnormality, wherein the image data is generated by reading a surface of a sheet on which an image forming apparatus forms an image;
   determining a compression condition, wherein the compression condition depends on whether or not an abnormality is detected in the step of inspecting and, when the abnormality is detected, the compression condition determined also depends on the kind of abnormality detected, wherein a first compression condition is determined for a first type of abnormality and a second compression condition is determined for a second type of abnormality, the first type of abnormality being one of a toner blot, a flaw, and a continuous abnormality in the feed direction of the sheet or a direction perpendicular to the feed direction, the second type of abnormality being another one of a toner blot, a flaw, and a continuous abnormality in the feed direction of the sheet or a direction perpendicular to the feed direction, and the first compression condition being different than the second compression condition, and
   generating data to be stored by compressing the image data under the compression condition.

* * * * *